3,558,476
CATALYTIC CRACKING PROCESS
Leroy V. Robbins, Jr., Joseph S. Anderson, and Clark E. Adams, Baton Rouge, La., assignors to Esso Research and Engineering Company, a corporation of Delaware
Continuation-in-part of application Ser. No. 453,617, May 6, 1965. This application June 12, 1968, Ser. No. 744,287
Int. Cl. C10g 11/02
U.S. Cl. 208—120                                        30 Claims

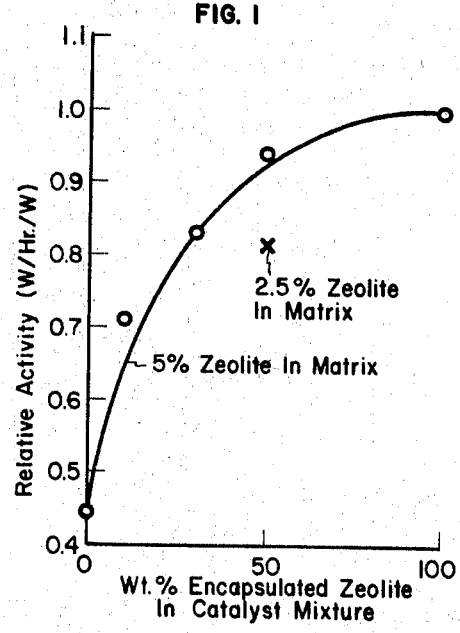
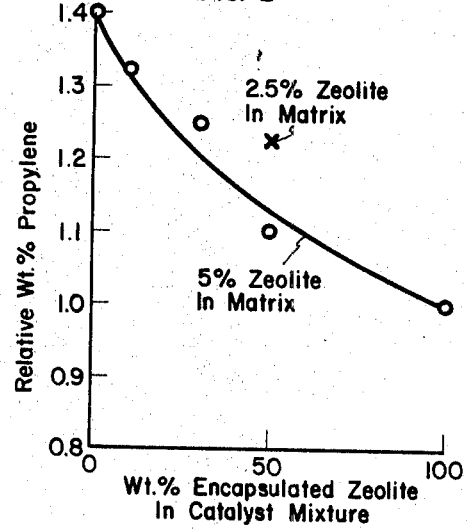
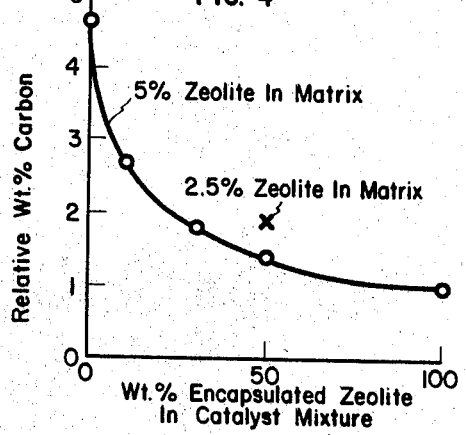
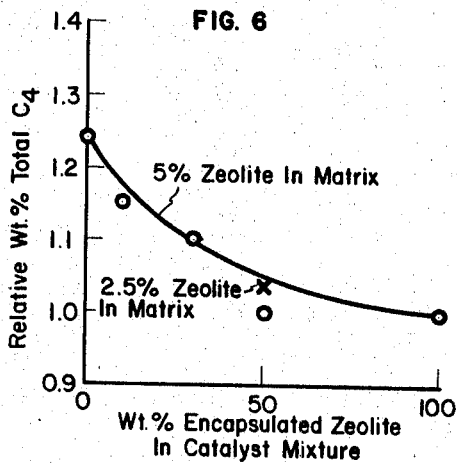
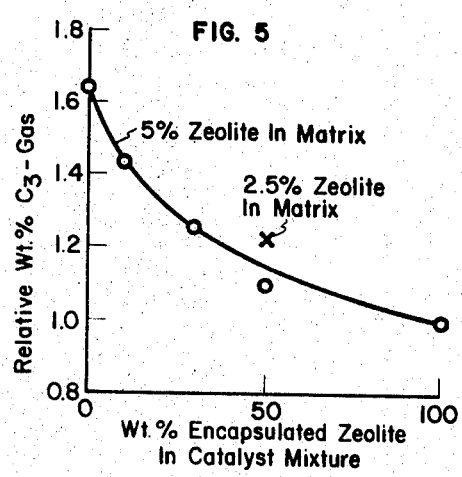
LEROY VIRGIL ROBBINS, JR.
JOSEPH SPOTSWOOD ANDERSON   INVENTORS
CLARK EDWARD ADAMS
BY *John J. Schlager*
ATTORNEY

ABSTRACT OF THE DISCLOSURE

A hydrocarbon conversion catalyst composition comprising a physical admixture of a conventional, amorphous, silica-containing cracking catalysts and a crystalline alumino-silicate zeolite suspended in an inorganic oxide gel matrix. The catalyst is particularly useful in the catalytic cracking of hydrocarbon feeds. When so used, the catalyst composition is more active and more selective than would be predicted from a consideration of its relative composition.

BACKGROUND

This application is a continuation-in-part of Ser. No. 453,617, filed May 6, 1965, in the names of Leroy V. Robbins, Jr., Joseph S. Anderson and Clark E. Adams, now abandoned.

This invention relates to a novel catalyst composition and its use in the catalytic conversion of hydrocarbon oils. Particularly, the invention relates to the catalytic cracking of hydrocarbon oils in the presence of a physical admixture of a conventional cracking catalyst and a new and improved cracking catalyst comprising a crystalline alumino-silicate zeolite distributed throughout and suspended in an inorganic gel matrix.

Catalytic cracking of hydrocarbon oils is usually accomplished by contact at suitable temperature and pressure with a catalyst capable of causing heavy molecules to be split or cracked into lighter molecules. Numerous materials, both of natural and snythetic origin, have the ability to catalyze the cracking of hydrocarbons. Conventional cracking catalysts include clays, amorphous gels, such as silica-alumina, silica-magnesia, etc. Typical cracking processes involve contacting petroleum oils boiling in the range above about 400° F. with a suitable catalyst at a temperature of about 600 to 1100° F. to obtain lower molecular weight fractions boiling in the motor fuel range. The cracking process usually consists of passing a suitable feed stock over the catalyst in the case of a fixed bed operation, or in contact with a moving bed or fluidized bed of catalyst at suitable temperature, pressure and feed rate to effect a substantial conversion of the feed to lower boiling material, such as gasoline.

The most widely used catalytic cracking catalyst in the past was an amorphous silica-alumina gel catalyst containing, for example, 13% alumina and 87% silica. In recent catalysts, the alumina content has been raised to about 25 wt. percent. These catalysts are generally prepared from silica hydrogel or hydrosol, which is mixed with alumina to secure the desired silica-alumina composition; and, if desired, oxides of other metals such as magnesium, zirconium, or other Group II, III, or IV metals. However prepared, the final catalyst is amorphous in nature, and has pore openings of varying sizes ranging from less than about 5 A. in diameter to as much as 200 A. in diameter and higher. This nonuniformity is a result of the amorphous character of these siliceous conventional cracking catalysts, and is responsible for certain undesirable characteristics. For example, in the very fine pores, a feed molecule encounters diffusion difficulties, and does not have free access over the entire catalyst surface. Also, certain product molecules cannot readily escape from the pore structure before being converted to undesirable lower boiling materials, e.g., dry gas, and coke. Difficulties and disadvantages such as these have contributed to the ever-present need for improved hydrocarbon conversion catalysts and catalyst supports.

Recently, considerable interest within the petroleum industry has been directed to the use of crystalline alumino-silicate zeolite materials in hydrocarbon conversion catalyst systems. These now well known materials, sometimes referred to as "molecular sieves," are characterized by a highly ordered crystalline structure with uniformly dimensioned pore openings, and are distinguishable from each other on the basis of composition, crystal structure, adsorption properties and the like. They are gaining wide acceptance as hydrocarbon conversion catalysts and catalyst supports due to substantially greater catalytic activity and selectivity to desired product. However, the use of these crystalline materials for catalytic purposes does suffer from various drawbacks. For example, one of the problems encountered has been the difficulty of handling the extremely fine zeolite crystals, which can be less than 5 microns in size, in fluidized or moving bed processes. Further, the crystalline zeolite may often be unsuitable for direct use as a catalyst because of too high an activity which can lead to overconversion and runaway reactions. Also, the stability of certain of these alumino-silicate zeolite materials at high temperatures or upon steam treatment, is often too low for commercial acceptance. Steam stability refers to the ability of a catalyst to resist rapid deactivation in the presence of steam, and is used, for example, to assist in the regeneration of catalysts which have become deactivated as a result of coke deposition. The catalyst is usually stripped of entrained oil by contact with steam and then treated with oxygen-containing gases at high temperatures to combust carbonaceous deposits. Still another disadvantage associated with the use of crystalline alumino-silicate zeolite catalysts resides in the fragility of the zeolite crystals which are commonly subject to considerable abrasion, breakage, and attrition loss when used in the form of a continuously moving stream such as in a fluidized operation.

The above disadvantages led to a recent development of combining the alumino-silicate zeolite crystals with a siliceous matrix, such as silica-alumina, so that the zeolite crystals become suspended in and distributed throughout the matrix. This newly developed composite catalyst will hereinafter be referred to as the "encapsulated" version, due to the coating of the zeolite crystals with siliceous gel. The encapsulated version of the catalyst, consisting of crystalline alumino-silicate zeolite embedded in conventional siliceous materials such as silica-alumina, is characterized by a high resistance to attrition, high activity, exceptional selectivity and steam stability. It can be prepared, for example, by dispersing the zeolite crystals in a suitable siliceous sol, and gelling the sol by various means. Certain procedures for preparing this encapsulated catalyst are described in U.S. Pat. No. 3,140,249. Other procedures involve the addition of zeolite crystals to a gelatinous precipitate of silica-alumina or silica-alumina hydrogel, and spray drying of the admixture to form spheroidal composite particles consisting of zeolite crystals encapsulated in silica-alumina gel matrix. The preferred forms of the encapsulated catalyst will be hereinafter described with greater particularity.

The encapsulated catalyst (i.e., crystalline zeolite distributed throughout and embedded in siliceous matrix) is, of course, more costly to manufacture than conventional cracking catalyst, such as silica-alumina. The added cost is however, overshadowed by substantially improved product yield and product distribution attributed to the presence of the crystalline zeolite component. It will be realized, however, that any reduction in the amount of encapsulated catalyst and its replacement with conventional cracking catalyst will markedly reduce total catalyst cost and will be highly desirable assuming that acceptable product yield, quality and distribution can be achieved.

Heretofore, the art has generally taught the catalytic use of either conventional amorphous siliceous gel type catalyst, or crystalline alumino-silicate zeolite catalyst, or the aforementioned encapsulated version of the zeolite catalyst which consists of the zeolite crystals embedded in a siliceous matrix. As mentioned, the encapsulated version has proven to be highly effective and will often be preferred to either the conventional amorphous gel catalyst or the crystalline zeolite catalyst per se. Substitution of either the amorphous or the crystalline zeolite catalysts with encapsulated catalyst is usually contemplated in terms of total replacement.

BRIEF DESCRIPTION

It has now been surprisingly discovered, however, that the encapsulated version need not be the sole catalytic component in all cases, and that a physical admixture of the encapsulated version and conventional amorphous gel catalyst is a highly effective alternate which will be preferred to the encapsulated version per se in certain instances due to the economic gain to be realized by substitution of the more expensive encapsulated version with less expensive conventional catalyst. Furthermore, although the encapsulation technique results in a "dilution" of the zeolite catalyst activity, in many instances catalytic activity may still be too high for existing plant facilities. In these instances, use of the aforesaid physical mixture of conventional amorphous catalyst and encapsulated catalyst will be desired. Other advantages associated with the use of this physical admixture accrue from the ease of adjustability of overall catalyst composition and characteristics in accordance with feed requirements or changing seasonal demands. Thus, product yields, distribution and quality can be readily adjusted for a given operation by simply varying the ratio of the components of the overall catalyst mixture. This is particularly useful and convenient in fluidized operations wherein a portion of catalyst is continuously being withdrawn, regenerated and returned. Still another advantage derives from the use of such catalyst mixture with low quality, catalyst-contaminating feeds, owing to the distribution of contaminant over both components, thereby diluting its effect on the more expensive encapsulated component.

It has further been surprisingly discovered that, in addition to all of the above advantages, the admixture of encapsulated zeolite catalyst and conventional amorphous gel catalyst does not display the expected linear relationship resulting from the mere additive effect of the two components. Thus, when varying proportions of the encapsulated zeolite component and the conventional amorphous component are physically admixed, the catalytic cracking activity of the admixture is higher than would be predicted from the linear relationship between the two. This unusual effect is demonstrated over the entire range of proportions and has been observed with various other criteria, such as dry gas yield, coke make, gasoline production, etc. In all cases, the result obtained with the physical admixture of the encapsulated zeolite component and the conventional amorphous component is substantially better than the expected additive result. By way of illustration, reference is made to the accompanying FIG. 1, the characteristics of which will hereinafter be more fully described. Briefly, FIG. 1 illustrates an activity curve obtained by plotting relative catalyst activity against the percentage of encapsulated zeolite cracking catalyst. The matrix material of the encapsulated component was silica-alumina gel. In FIG. 1, the abscissa origin represents 100% conventional silica-alumina amorphous gel catalyst and 0% of encapsulated crystalline zeolite catalyst. It will be observed that the conventional silica-alumina cracking catalyst exhibited a relative activity of about 0.45. Addition of the encapsulated zeolite component and gradual increase in its proportion resulted in a steady increase in activity, but did not, however, exhibit the expected linear relationship. Thus, for example, the use of 30 wt. percent of the encapsulated component would be expected to produce an activity of about 0.6 by the predictable additive effect of the two components. As shown by the activity curve of FIG. 1, an activity of about .83 was displayed instead. Similarly, at the 50% encapsulated zeolite component level, an activity of about .7 would be expected by the linear relationship, but the exhibited activity was .93. In this last illustration, therefore, about 93% of the maximum catalytic activity attainable with 100% of the encapsulated zeolite catalyst can be achieved with only 50% of the encapsulated catalyst. The substantial economic savings possible are thus readily apparent, since 50% of the expensive encapsulated zeolite component can be replaced with conventional amorphous silica-alumina component, with an attendant activity loss of only about 7%.

DETAILED DESCRIPTION

The two components of the catalyst mixture used in the present invention will now be described in greater detail.

Amorphous gel cracking catalyst component

The amorphous cracking component of the catalyst mixture employed in the invention can be any of the conventional siliceous varieties containing a major amount of silica and a minor amount of an oxide of at least one metal in Groups II–A, III–A and IV–B of the Periodic Table (Handbook of Chemistry and Physics, 38th edition, 1957). Representative catalysts will include silica-alumina, silica-magnesia, silica-zirconia, silica-thoria, silica-beryllia, silica-titania, silica-alumina-zirconia, silica-alumina-magnesia, silica-magnesia-zirconia, etc.

Silica-alumina amorphous cracking catalysts will be especially preferred and are well known in the art. They are generally prepared from silica hydrogel or hydrosol, and mixed with alumina to secure the desired silica-alumina composition. The alumina content may range from about 5 to 40 wt. percent with the preferred composition having an alumina content of about 10 to 35 wt. percent, e.g., about 13 to 30 wt. percent. Various procedures are known for making silica-alumina catalysts. One such procedure valuable for producing high alumina contents is described in U.S. Pat. No. 2,844,523, and involves mixing sodium silicate solution and sulphuric acid in such ratio as to produce a slightly acid silica hydrosol of relatively short set time, adding aluminum sulphate to the silica hydrosol before setting occurs, then adding with agitation sufficient amount of ammonia solution to form a mixture having a pH of about 4 to 5, followed by aging the mixture for a period of time to allow relatively slow precipitation of the alumina and good mixing of the alumina with the hydrated silica. Thereafter, additional ammonia solution is added until the mixture is about neutral in pH. By means of a partial gelation at a lower pH, high alumina containing silica-alumina catalysts are prepared which can contain in the order of 20 to 40% alumina.

Another useful method for making a high alumina containing silica-alumina catalyst is described in U.S. Pat. No. 2,908,635. This method involves mixing sodium silicate solution and sulphuric acid so as to produce a slightly acid silica hydrosol of extended set time. Aluminum sulphate solution is added to the silica hydrosol before setting occurs. Ammonia is then added with agitation to form a neutral water slurry of gel particles and to react the alumina with the hydrated silica.

Numerous other methods are available for preparing silica-alumina amorphous gel catalyst. It will be understood that any suitable method can be employed to produce any of the conventional catalysts useful in catalytic cracking processes.

Encapsulated zeolite component

The encapsulated zeolite component of the catalyst mixture used in the invention includes a crystalline alumino-silicate zeolite. These crystalline zeolites are now well known in the art and are characterized by a highly ordered crystalline structure having uniformly dimensioned pores, and an alumino-silicate anionic structure wherein alumina and silica tetrahedra are intimately connected to each other to provide a large number of active catalytic sites, with the uniform pore openings facilitating entry of molecular structures of a size and shape capable of entering the zeolite structure. The crystalline alumino-silicate zeolites used in the present invention should have uniform pore openings of about 6 to 15 angstrom units, more preferably about 7 to about 13 angstrom units. These values refer to the effective pore diameter of the pore openings; i.e., the diameter at the conditions of use capable of substantially admitting entry to smaller size molecules while substantially excluding larger size molecules.

Suitable natural crystalline zeolites are exemplified by the mineral faujasite, which may be effectively employed in the invention. Synthetically produced alumino-silicate zeolites having the required pore diameters will, however, be preferred in the present invention, and are exemplified by such materials as synthetic faujasite, synthetic mordenite, etc. In general, all crystalline alumino-silicate zeolites, in natural or synthetic form, contain a substantial portion, e.g., above about 10 wt. percent of an alkali metal oxide, normally sodium oxide.

More specifically, the preferred crystalline alumino-silicate zeolites employed in the present invention will have the following chemical formula in the anhydrous form expressed in terms of moles:

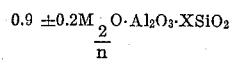

In the above formula, M is selected from the group consisting of metal cations and hydrogen, $n$ is the valence of M, and X is a number in the range of from about 1 to about 10. Preferably, X will be above about 3, e.g., up to about 7, and most preferably 4 to 6. Crystalline zeolites having relatively high silica-to-alumina ratios, i.e. above about 3, have been found to be more active, selective and stable than those having relatively low ratios, e.g. 2. The most preferred synthetic zeolites for use in the present invention will have a crytal structure similar to the natural mineral faujasite with the just defined silica-to-alumina mole ratio. For use in the present invention a substantial portion of the alkali metal, e.g. sodium, in the zeolite as naturally occurring or as prepared synthetically, is replaced with a cation (either a metal cation or a hydrogen-containing cation, e.g. $NH_4^+$) so as to reduce the alkali metal oxide (e.g. $Na_2O$) content to less than about 10 wt. percent. Preferably, a major portion of the cation content of the zeolite is supplied by a cation other than sodium. More preferably about 5 wt. percent and most preferably about 1 to 5 wt. percent (based on zeolite) of the initial $Na_2O$ content will remain. The base exchange may be performed on the crystalline zeolite prior to its encapsulation in the siliceous matrix. More preferably, however, the ion exchange will be accomplished after the encapsulation, i.e., after the unexchanged zeolite has been combined with the siliceous matrix. Accordingly, the details of the base exchange procedure will be hereinafter described in connection with the encapsulation technique.

The processes for preparing crystalline alumino-silicate zeolites having uniform effective pore openings in the range of about 6 to 15 A., are now well known in the art. These methods generally involve the reaction of predetermined amounts and ratios of silica, alumina and sodium hydroxide. Alumina may be supplied in the form of sodium aluminate or an alumina sol or the like, silica may be supplied in the form of sodium silicate and/or silica gel and/or silica sol, and alkali may be furnished by an alkaline hydroxide, e.g. sodium hydroxide. As taught in the art, careful control is kept over the pH, sodium ion concentration and the crystallization period. Suitable processes for preparing crystalline zeolites are described, for example, in U.S. Pats. Nos. 2,882,244, 2,971,903 and 3,130,007. After their preparation and removal of extraneous soluble materials, the zeolites are dehydrated, e.g., by calcination, at elevated temperature.

The siliceous gel which serves as the matrix in which the above crystalline zeolite is uniformly distributed, i.e. "encapsulated," can be silica gel per se, or more preferably a a cogel of silica and an oxide of at least one metal selected from the group consisting of metals of Groups II–A, III–A and IV–B of the periodic table; as set forth on pages 394 and 395 of the Handbook of Chemistry and Physics, 38th edition (1956–57). The terms "gel" and "cogel" as used herein are intended to include gelatinous precipitates, hydrosols, hydrogels, etc. Suitable cogels include, for example, silica-alumina, silica-magnesia, silica-zirconia, silica-thoria, silica-beryllia, silica-titania, as well as ternary combinations such as silica-alumina-zirconia, silica-alumina-magnesia, silica-magnesia-zirconia, etc. Preferred cogels will include silica-alumina, silica-alumina-zirconia, and silica-magnesia, with silica-alumina being particularly preferred. These gels and cogels will generally comprise a major proportion of silica and a minor proportion of the other aforementioned oxide or oxides. Thus, the silica content of the siliceous gel or cogel matrix will generally fall within the range of 55 to 100 wt. percent, preferably 60 to 90 wt. percent, and the other metal oxide or oxides content will generally fall within the range of 0 to 45 wt. percent, preferably 10 to 40 wt. percent. For the particularly preferred silica-alumina matrix, the alumina content will preferably be about 8 to 40 wt. percent, preferably 12 to 30 wt. percent. Siliceous hydrogels utilized herein, e.g., silica-alumina hydrogel or gelatinous co-precipitate, can be produced by any of a number of known methods. They may be used as commercially supplied or may be separately prepared. For example, siliceous hydrogels can be prepared by hydrolysis of ethylorthosilicate, acidification of an alkali metal silicate containing a compound of the metal desired in the ultimate cogel, etc. Thus, a suitable silica-alumina hydrogel can be produced by preparing a hydrous precipitate of silica by mixing a solution of sodium silicate with an acid, e.g. sulfuric acid, to produce a slurry having pH below 7, usually below about 4; then adding a solution of an aluminum salt, e.g. aluminum sulfate, and adjusting the pH of the mixture to above about 4 by addition of alkaline material, e.g. ammonia, in order to precipitate alumina.

The "encapsulated" zeolite components of the catalysts utilized in the present process are prepared by intimately admixing the aforedescribed crystalline alumino-silicate zeolite with the siliceous hydrogen of the type hereinbefore described and thereafter obtaining a composite product comprising the zeolite component uniformly distributed throughout and suspended in a siliceous gel. The formation of the encapsulated zeolite component can be achieved by various means. For example, alumino-silicate zeolite crystals can be dispersed in a siliceous hydrosol, or in one of the reactants used in forming the hydrosol where the hydrosol is characterized by a short gelation time. This procedure is described in U.S. Pat. No. 3,140,-249 which specifies the weight means particle diameter of the alumino-silicate required to produce the desired strength and diffusivity of the product. The siliceous hydrosol containing the zeolite crystals is then allowed to set after a suitable period of time forming the zeolite-gel matrix product, and the gelled product can thereafter be dried and broken into pieces of desired size. Alternatively, the gel may be extruded or pelleted to obtain uniformly shaped pieces. Also, the hydrosol can be introduced into perforations of a perforated plate, retained therein until the sol sets to a hydrogel, followed by removal of the hydrogel pieces from the plate. Further, spheroidal particles can be obtained by methods as described, for example, in U.S. Pat. No. 2,384,946. These methods involve introducing globules of hydrosol into a column of water-immiscible liquid; e.g. an oil medium. The globules of hydrosol set to a hydrogel and subsequently pass into a bottom water layer from which they are recovered. The use of spherically-shaped particles is of particular advantage in moving bed and fluidized bed hydrocarbon conversion processes.

While the encapsulated zeolite component of the catalyst used in the invention can be prepared by any of the above methods, it will be particularly preferred to subject the mixture of crystalline zeolite and siliceous hydrogel, after suitable homogenization (e.g., by passage through a colloid mill to produce a fine dispersion) to a rapid evaporation technique, such as spray drying, flash drying, etc. The spray drying step comprises spraying the composite mixture through nozzle into a tower containing hot flowing gases at a temperature at the nozzle in the range of about 400 to 650° F. This procedure is desirable because of increased attrition resistance achieved due to the spherical nature of the particles obtained, as well as the excellent particle size distribution useful in fluidized bed processes, e.g., predominately 20 to 80 micron average particle diameter. A highly porous solid is thus obtained having improved attrition resistance.

The amount of crystalline zeolite added to the siliceous gel will generally be in the range of about 1 to 30 wt. percent, preferably about 2 to 20 wt. percent, most preferably about 3 to 10 wt. percent, based on the final encapsulated product. The water content of the hydrogel before spray drying is adjusted to about 88 to 96 wt. percent, and the crystalline zeolite is added in sufficient amount to produce the aforementioned concentrations.

By whatever means prepared, the encapsulated zeolite component is supplied in the form of discrete particles containing intimately dispersed zeolite crystals distributed essentially uniformly throughout the siliceous gel matrix. The zeolite crystals are thus coated by or "encapsulated" in the gel matrix as opposed to a mere physical admixture of zeolite and gel particles. It is this "encapsulated" nature of the zeolite-siliceous gel component that is believed responsible for the surprising results obtained when it is physically admixed with the conventional amorphous cracking catalyst to form the catalyst mixture of the invention. As will be hereinafter illustrated, these unexpected results cannot be attributed to a mere reduction in zeolite concentration since, at the same overall zeolite concentration, substantially better results are obtained with a physical admixture of encapsulated zeolite and conventional amorphous catalyst than are obtained with a 100% encapsulated zeolite. For example, a 50-50 mixture of conventional amorphous silica-alumina gel catalyst and encapsulated zeolite in silica-alumina matrix catalyst gave substantially better results than 100% encapsulated zeolite in silica-alumina matrix catalyst, the concentration of zeolite in both catalysts being identical.

As hereinbefore indicated, the alkali metal containing crystalline alumino-silicate zeolite must be base exchanged to reduce its alkali metal oxide, e.g. $Na_2O$, content to the levels hereinbefore set forth. Base exchange may be performed either before or after the zeolite is combined with the siliceous gel. Preferably, base exchange will be performed after mixing of the zeolite and siliceous gel by exchanging the zeolite-matrix product with an aqueous solution of the desired cation or cations to replace the alkali metal originally in the zeolite. Base exchange is effected by treatment with a solution containing a cation capable of replacing alkali metal, and is continued for a sufficient period of time to reduce the alkali metal content to the desired values hereinbefore set forth. The cation used for the base exchange can be a metal cation or a hydrogen-containing cation or a mixture thereof. The metal cation can be a cation of metals in Groups I-B to VIII and the rare earth metals, more preferably metals in Groups II-A, III-A and the rare earth metals. More than one cation can be introduced either simultaneously or by successive exchange treatments. Particularly preferred cations will be hydrogen or hydrogen-containing cations, e.g. ammonium ion, and/or alkaline earth metal cations, e.g. magnesium cations. Examples of other suitable cations include aluminum, barium, calcium, rare earth metals such as cerium, praseodymium, lanthanum, neodymium and samarium, as well as manganese, strontium, zinc, zirconium, etc. It will be understood that mixtures of these various cations, and mixtures of the same with other ions, such as ammonium, can be employed. While base exchange is ordinarily conducted in an aqueous medium, nonaqueous solutions, e.g. alcoholic solutions, can be employed, assuming of course that ionization can occur.

Base exchange treatment is accomplished in conventional manner by procedures well known to the art. Normally, the zeolite or zeolite-containing product is exchanged with a suitable salt of the above metals or a hydrogen-containing cation solution, at a temperature of 60° to 180° F. via conventional ion exchange techniques. Suitable salt solutions include the sulfates, nitrates, chlorides, carbonates, etc. Organic salts can also be used such as acetates, formates, etc. The cation concentration in the treating solution and the length and number of ion exchange treatments will readily be determined according to the extent of ion exchange desired. Similarly, the temperature at which base exchange can be effective is subject to wide variation, generally from room temperature to an elevated temperature below the boiling point of the treating solution. Usually, an excess of base exchange solution will be employed as will be readily apparent to those skilled in the art. It will be appreciated that the period of contact, temperature, concentration of treating solution, etc., are all interrelated variables which will be again determined by the degree of ion exchange to be accomplished which should be sufficient to reduce the alkali metal oxide content of the zeolite to the values hereinbefore set forth. After the base exchange treatment, the product is separated and washed to remove extraneous salts, etc., and then dried either at ambient temperature or at elevated temperature, e.g. 150° to 600° F.

Catalyst mixture of the invention

The foregoing descriptions have defined the proportions of the various ingredients in each component of the overall catalyst mixture employed in the present process, without defining the composition of the latter. The relative proportions of encapsulated zeolite component and conventional amorphous gel component in this catalyst mixture will vary widely, largely depending upon economic considerations; i.e., taking into account the relative costs of the two components, the intended products and product distributions, and the current market situation. Since for all relative proportions of the two components, such variables as catalyst activity and gasoline yield will generally be lower than that obtainable with 100% encapsulated zeolite component, but higher than would normally be expected with a physical admixture of the two components, it will be realized that the particular proportion of encapsulated zeolite component will be largely dictated by economic considerations and the current needs of the particular refiner. Thus, the following approximate ranges are given as typical illustrative values which will usually be satisfactory in most situations. It will be understood, however, that these values are subject to variation should be an unusual situation arise, such as, for example, where there is a high demand for gasoline, or where catalyst costs indicate that a change in proportions would be economically advantageous. Generally, therefore, the catalyst admixture used in the present process will comprise about 10 to about 70 wt. percent of the encapsulated component, and about 30 to about 90 wt. percent of the conventional amorphous gel component; preferably about 10 to about 50 wt. percent of the encapsulated component, and about 50 to about 90 wt. percent of the amorphous gel component. More preferably, a minor proportion of the encapsulated component and a major proportion of the amorphous gel component will be employed, with about 20 to about 40 wt. percent of the encapsulated component and about 60 to about 80 wt. percent of the amorphous gel component being especially preferred.

The catalyst composition hereinbefore described is highly effective for various hydrocarbon conversion reactions, the most notable of which being catalytic cracking. Moreover, it is within the scope of the present invention to modify the catalyst composition by incorporation of various other catalytic components capable of promoting a particularly desired reaction, or of shifting a particular equilibrium in a desired direction. For example, it may be desired to incorporate a hydrogenation component, e.g. a noble metal, for such reactions as hydrocracking, hydrodealkylation, etc.

Catalytic cracking with the catalyst composition hereinbefore described can be carried out in conventional manner. Suitable catalytic cracking conditions include a temperature within the general range of 700° F. to 1200° F. and a pressure ranging from subatmospheric pressure up to several hundred atmospheres. The usual conditions which will be employed will include a temperature of about 750° to 1000° F., e.g. 875° to 980° F., and a pressure of atmospheric to 100 p.s.i.g., e.g., atmospheric to about 20 p.s.i.g. The process can be carried in fixed bed, moving bed, slurry, or fluidized bed operation. The fluidized bed operation is preferred, and in such an operation, the relative concentration of catalyst components can be accomplished by (1) feeding each component to the reactor, separately, in such an amount as to maintain the desired composition and reactor loading, or (2) by preblending to a desired composition and then feeding the blend to the reactor in such an amount as to maintain the desired reactor loading. The contact time of the oil with the catalyst will depend upon the particular feed and the particular results desired to give a substantial degree of cracking to lower boiling products. Suitable catalyst-to-oil ratios will range from about 1 to 1 to about 20 to 1, preferably 5 to 1.

The feed stocks suitable for conversion in accordance with the invention include any of the well known feeds conventionally employed in hydrocarbon conversion processes. Usually, they will be petroleum derived, although other sources such as shale oil are not to be excluded. Typical of such feeds are included heavy and light virgin gas oils, solvent extracted gas oils, coker gas oils, steam cracked gas oils, middle distillates, steam cracked naphthas, coker naphthas, catalytically cracked naphthas, cycle oils, deasphalted residua, etc.

PREFERRED EMBODIMENT

The invention will be further understood by reference to the following examples which illustrate a preferred embodiment but should not be construed as limiting.

EXAMPLE 1

This example describes the components of the catalyst mixture used in the process of the invention.

(A) Conventional amorphous silica-alumina gel catalyst

The conventional amorphous silica-alumina gel catalyst utilized herein was a commercially available 25% alumina-75% silica synthetic cracking catalyst supplied by the Davison Chemical Division of W. R. Grace and Co.

(B) Encapsulated zeolite component (1) Preparation of crystalline alumino-silicate zeolite.—A crystalline alumino-silicate zeolite having a crystal structure similar to the mineral faujasite, a silica-to-alumina mole ratio of about 5 and uniform pore openings of about 13 A. was prepared from an aqueous reaction mixture having a $SiO_2/Al_2O_3$ ratio of 10 to 1, a $Na_2O$ to $Al_2O_3$ ratio of 3 to 1, and a $H_2O/Al_2O_3$ ratio of 150 to 1, all expressed in terms of moles. The reaction mixture was slowly heated to a crystallization temperature of about 200° F. over a period of about two days and maintained at this temperature until crystallization was complete, which took about four days including the heat-up period. The reaction was terminated by adding about 1 volume of cold water per volume of reaction mixture and the crystalline product was separated from residual mother liquor by centrifugation. The crystalline product cake was washed with water until the wash water had a pH of 11 or less, and then dried at 230° F.

(2) Base exchange procedure.—The dried sodium faujasite was exchanged three times with $MgSO_4$ solution containing about 0.5 weight of $MgSO_4$ per weight of faujasite at room temperature. This treatment reduced the soda content of the faujasite from 13.7 wt. percent to 4.8 wt. percent.

(3) Encapsulation technique.—The magnesium-containing crystalline zeolite prepared above was encapsulated in a silica-alumina gel matrix by adding the zeolite crystals to a silica-alumina hydrogel and spray drying the admixture. The silica-alumina-hydrogel was obtained from a commercial supplier. It is believed to have been made by adding sulfuric acid to a sodium silicate solution to produce a slurry of precipitated hydrous silica having a pH of about 4. To this is added a solution of aluminum sulfate sufficient to give a final product containing 13% alumina and 87% silica. The pH of the mixture is raised to about 6 by the addition of a 28% solution of ammonia and the hydrous precipitate is then washed on rotary filters, first at a pH of about 6.5 and finally at a pH of about 7.5.

The hydrous precipitate of silica-alumina was slurried in twice its weight of water, and a sufficient quantity of the above magnesium-sodium form crystalline zeolite was added to give 5 wt. percent crystalline zeolite in the finished product. The mixture was passed through a colloid mill, and then spray dried at 650° F. inlet temperature and 250° F. outlet temperature. The resulting encapsulated zeolite component was treated with steam at 1400° F. and atmospheric pressure for sixteen hours.

The above conventional amorphous silica-alumina gel catalyst and the above encapulated zeolite catalyst, and mixtures of the two catalysts were utilized in catalyic cracking tests as described in the following example. In addition, an encapsulated zeolite catalyst containing 2.5 wt. percent of crystalline zeolite was prepared (as opposed to the 5 wt. percent catalyst described above). All of the catalysts and catalyst mixtures used in the following tests were steamed at 1400° F. and atmospheric pressure for sixteen hours before testing.

EXAMPLE 2

A series of catalytic cracking tests were performed with an East Texas gas oil having a boiling range of about 500° to 700° F. and an API gravity of 33.3°. Fluidized bed conditions were employed at 950° F. at atmospheric pressure with a two minute process period. The catalysts and catalyst mixtures tested in this manner included 100% of the conventional amorphous silica-alumina gel catalyst described in Example 1; 100% of the encapsulated crystalline zeolite catalyst described in Example 1; physical mixtures of the conventional amorphous silica-alumina gel component and the encapsulated zeolite component in amounts of 10 wt. percent, 30 wt. percent and 50 wt. percent of the encapsulated component; and finally 100% of encapsulated zeolite catalyst containing only 2.5 wt. percent zeolite. The various catalyst physical mixtures used were prepared by simply weighing the appropriate amount of each component supplied in the form of a dry powder, and mixing well before charging to the test unit. The results of these tests are expressed in terms of catalyst activity, carbon make, gasoline yield, and $C_3$, $C_3^-$, and $C_4$ yield. The results are expressed in values relative to those obtained with 100% of the 5 wt. percent encapsulated zeolite component. They are summarized in the following table and shown graphically in the attached FIGS. 1–6 wherein the aforementioned variables are plotted against the weight percent of the encapsulated zeolite component in the catalyst mixture utilized.

ings can be realized by replacement of a substantial portion of the encapsulated zeolite component with conventional silica-alumina amorphous gel cracking catalyst.

The results obtained with the 100% encapsulated component containing 2.5 wt. percent zeolite further illustrate the advantages to be obtained by the teachings of the present invention. These results are indicated by the "X" points in the attached figures, which represent 100% encapsulated zeolite component (not 50%). (Reference should therefore be made to the ordinate values only). It will be noted that 100% of an encapsulated zeolite catalyst containing 2.5% zeolite has the same zeolite concentration as a 50% mixture of encapsulated zeolite containing 5% zeolite. (For this reason the "X" points are shown at the 50% abscissa value.) It would be expected, therefore, that the cracking results should be

TABLE I.—CATALYTIC CRACKING OF EAST TEXAS GAS OIL

| Catalyst | Relative [1] | | | | | |
| --- | --- | --- | --- | --- | --- | --- |
| | Activity | Carbon | $C_3^-$ gas | Total $C_4$ | $C_5/430°$ F. | $C_3H_6$ |
| 100% encapsulated zeolite [2] | 1.00 | 1.00 | 1.00 | 1.00 | 1.00 | 1.00 |
| 10% encapsulated zeolite [2] | 0.71 | 2.68 | 1.43 | 1.15 | 0.81 | 1.33 |
| 30% encapsulated zeolite [2] | 0.83 | 1.81 | 1.27 | 1.10 | 0.88 | 1.25 |
| 50% encapsulated zeolite [2] | 0.94 | 1.45 | 1.10 | 1.00 | 0.95 | 1.10 |
| 100% silica-alumina conventional gel cracking catalyst | 0.44 | 4.66 | 1.64 | 1.23 | 0.75 | 1.41 |
| 100% encapsulated zeolite containing 2.5% zeolite | 0.81 | 1.90 | 1.21 | 1.03 | 0.90 | 1.23 |

[1] Relative to 100% encapsulated zeolite component containing 5 wt. percent zeolite.
[2] 5 wt. percent zeolite.

Reference to the attached figures indicates that, for each of the variables tested, a substantial improvement was observed over the normally expected linear relationship resulting from simple physical admixture of the two components. Thus, it would ordinarily be expected that, as the percentage of encapsulated zeolite component rose from 0 to 100%, an essentially straight line relationship would follow. As indicated, however, in all cases a straight line relationship was not obtained, and for any value along the abscissa of the curves, the performance of the catalyst mixtures was substantially better than the normally predicted value. The catalyst mixtures of the invention exhibited substantially higher activity and gasoline yield, and substantially lower gas and carbon make than would be expected from the simple additive effect of the two components of the mixture. It is, therefore, quite evident that a substantial economic saving can be realized by employing a mixture of the relatively expensive encapsulated component and the relatively inexpensive conventional cracking component, instead of a 100% encapsulated zeolite catalyst. The illustrated effects are particularly pronounced over the range of 10 to 50% encapsulated component, while above 50% concentration the slopes of the curves gradually approach the horizontal. As an illustration of the advantages to be obtained from using the catalyst mixture of the present invention, reference to the activity curve indicates that with only 30% of the encapsulated component, 70% of the activity advantage and 78% of the carbon make advantage of the encapsulated catalyst over the conventional catalyst is obtained; i.e. (.83–.44)/(1.0–.44) and (4.66–1.81)/(4.66–1.00). As another illustration, at the 50% encapsulated component level, about 89% of the activity advantage is obtained; i.e. (.94–.44)/(1–.44). It can therefore be concluded that by a very small sacrifice in activity, carbon make, etc., a substantial economic saving about equivalent. As illustrated, however, this was not the case; i.e., lowering the zeolite concentration in the 100% encapsulated component to the level of the 50% mixture gave poorer results in terms of lower activity, lower gasoline yield, and higher gas and carbon make. It is thus indicated that the substantial economic saving achieved by the present invention cannot be duplicated by merely lowering the concentration of the expensive zeolite component in its encapsulated version, since concomitant reduction in activity and gasoline yield accrues.

EXAMPLE 3

To further illustrate the present invention, a set of catalytic cracking tests were performed, for purposes of comparison with an East Texas gas oil having a boiling range of about 500 to 700° F. and an API gravity of 33.3°. The conditions employed for these tests were identical to those used in Example 2; i.e., 950° F. at atmospheric pressure with a two minute process period. The catalyst compositions tested were (1) a composition comprising 30 wt. percent of the encapsulated crystalline zeolite catalyst described in Example 1 and 70 wt. percent of an alumina fines (through 325 mesh) and (2) a composition comprising 50 wt. percent of the encapsulated crystalline zeolite catalyst described in Example 1 and 50 wt. percent of an alumina fines (through 325 mesh). The catalyst compositions used in these tests were prepared by the method set forth in Example 2. The results, which are reported on the same basis as that used in Example 2, are summarized in Table II.

These data clearly show that the relative activity of the alumina-diluted catalyst is only about ½ the activity of the silica-alumina diluted catalyst of the present invention. They also show that the carbon make is substantially higher, being some 40% higher with the alumina-diluted catalyst than with the silica-alumina catalyst having the same relative composition.

TABLE II.—CATALYTIC CRACKING OF EAST TEXAS GAS OIL

| Catalyst | Relative [1] | | | | | |
| --- | --- | --- | --- | --- | --- | --- |
| | Activity | Carbon | $C_3^-$ gas | Total $C_4$ | $C_5/430°$ F. | $C_3H_6$ |
| 30% encapsulated zeolite [2]/70% alumina | 0.47 | 2.08 | 1.09 | 0.97 | 0.95 | 1.06 |
| 50% encapsulated zeolite [2]/50% alumina | 0.42 | 2.66 | 1.12 | 1.01 | 0.91 | 1.07 |

[1] Relative to 100% encapsulated zeolite component containing 5 wt. percent zeolite.
[2] 5 wt. percent zeolite.

EXAMPLE 4

To demonstrate the commercial feasibility of the present invention a run was made in a continuous fluid-bed unit. The catalyst used throughout the run was a composition comprising 40 wt. percent of an encapsulated crystalline zeolite catalyst which was prepared equivalent to the catalyst described in Example 1 and 60 wt. percent of an amorphous silica-alumina gel catalyst containing 75 wt. percent silica and 25 wt. percent alumina. Throughout the run, the catalyst composition in the reactor was maintained by adding the two catalyst components to the reactor, separately, in amounts such that the relative feed rate of each component corresponded to 40 wt. percent of the crystalline component and 60 wt. percent of the amorphous component. The cracking results obtained on samples of the catalyst were commensurate with those reported in Example 2. Moreover, an analysis of the fines collected from the unit fractionator did not show any selective loss of either catalyst component due to attrition. It follows that the desired catalyst composition could be maintained by feeding a previously blended composition to the reactor in a single stream.

Having thus described the invention what is claimed is:

1. A catalyst composition comprising a physical mixture of an amorphous hydrocarbon conversion catalyst consisting essentially of a major amount of silica and a minor amount of alumina, and a catalyst comprising a crystalline alumino-silicate zeolite in a siliceous matrix.

2. The composition of claim 1, wherein said crystalline alumino-silicate zeolite has uniform pore openings of between about 6 and 15 A. and a sodium content below about 10 wt. percent.

3. The composition of claim 1, wherein said zeolite has a silica to alumina mole ratio above about 3.

4. The composition of claim 1, wherein the major portion of the cation content of said zeolite is supplied by a cation selected from the group consisting of hydrogen-containing cations, metal cations, and mixtures thereof.

5. The composition of claim 3, wherein said zeolite has a crystal structure similar to faujasite.

6. The composition of claim 5, wherein said zeolite has been base exchanged with a metal cation selected from the group consisting of cations of metals in Groups II-A, III-A, and the rare earth metals.

7. The composition of claim 1, wherein said amorphous hydrocarbon conversion catalyst comprises about 30 to about 90 wt. percent of said composition, and wherein said crystalline alumino-silicate zeolite in siliceous matrix catalyst comprises about 10 to about 70 wt. percent of said composition.

8. The composition of claim 1, wherein said amorphous hydrocarbon conversion catalyst comprises about 50 to about 90 wt. percent of said composition, and wherein said crystalline alumino-silicate zeolite in siliceous matrix catalyst comprises about 10 to about 50 wt. percent of said composition.

9. The composition of claim 7, wherein said crystalline zeolite in siliceous matrix catalyst comprises about 1 to 30 wt. percent crystalline zeolite.

10. The composition of claim 1, which comprises about 20 to about 40 wt. percent of said crystalline zeolite in siliceous matrix catalyst and about 60 to about 80 wt. percent of said amorphous catalyst.

11. In a catalytic cracking process which comprises contacting hydrocarbons at catalytic cracking conditions with a fluidized physical mixture of catalytic components containing (A) amorpous catalytic cracking catalyst consisting essentially of a major amount of silica and a minor amount of alumina and (B) crystalline alumino-silicate zeolite encapsulated in siliceous matrix; the improvement which comprises maintaining the concentration of said (A) component within the range of about 30 to about 90 weight percent and the concentration of said (B) component within the range of about 10 to about 70 weight percent of said fluidized physical mixture during said process.

12. The improvement of claim 11, wherein said siliceous matrix is selected from the group consisting of silica gel and cogels of silica and an oxide of at least one metal selected from the group consisting of metals in Groups II-A, III-A, and IV-B of the Periodic Table.

13. The improvement of claim 11, wherein said crystalline alumino-silicate zeolite has uniform pore openings of between about 6 and 15A. and a sodium content below about 10 weight percent.

14. The improvement of claim 13, wherein said zeolite has a silica-to-alumina mole ratio above about 3.

15. The improvement of claim 14, wherein said zeolite has a crystal structure essentially similar to faujasite.

16. The improvement of claim 15, wherein said zeolite has been base exchanged with cations selected from the group consisting of hydrogen-containing cations, metal cations, and mixtures thereof.

17. The improvement of claim 16, wherein said metal cations are magnesium cations.

18. The improvement of claim 11, wherein the major portion of the cation content of said zeolite is supplied by cations selected from the group consisting of hydrogen-containing cations, metal cations, and mixtures thereof.

19. The improvement of claim 18, wherein said metal cations are magnesium cations.

20. In a catalytic cracking process which comprises contacting hydrocarbons at catalytic cracking conditions with a fluidized physical mixture of catalytic components including (A) amorphous catalytic cracking catalyst consisting essentially of a major amount of silica and a minor amount of alumina and (B) crystalline alumino-silicate zeolite encapsulated in siliceous matrix; the improvement which comprises maintaining the concentration of said (A) component within the range of about 50 to about 90 weight percent and the concentration of said (B) component within the range of about 10 to about 50 weight percent of said fluidized physical mixture during said process.

21. The improvement of claim 11, wherein said concentration range of component (A) is about 60 to about 80 weight percent and the concentration of said (B) component is about 20 to about 40 weight percent.

22. The improvement of claim 11, wherein the zeolite concentration of said component (B) is about 1 to about 30 weight percent.

23. In a catalytic cracking process which comprises contacting hydrocarbons at catalytic cracking conditions with a fluidized physical mixture of catalytic components containing (A) amorphous catalytic cracking catalyst consisting essentially of a major amount of silica and a minor amount of alumina and (B) crystalline alumino-silicate zeolite encapsulated in siliceous matrix; the improvement which comprises maintaining the concentration of said (A) component within the range of about 30 to about 90 weight percent and the concentration of said (B) component within the range of about 10 to about 70 weight percent of said fluidized physical mixture by feeding both components to the reactor in an amount sufficient to maintain said concentrations and the desired reactor loading during said process.

24. The improvement of claim 23 wherein said siliceous matrix is selected from the group consisting of silica gel and cogels of silica and an oxide of at least one metal selected from the group consisting of metals in Groups II-A, III-A, and IV-B of the Periodic Table.

25. The improvement of claim 23, wherein said crystalline alumino-silicate zeolite has uniform pore openings of between about 6 and 15 A. and a sodium content below about 10 weight percent.

26. The improvement of claim 25, wherein said zeolite has a silica-to-alumina mole ratio above about 3.

27. The improvement of claim 26, wherein said zeolite has a crystal structure essentially similar to faujasite.

28. The improvement of claim 23, wherein the major portion of the cation content of said zeolite is supplied by cations selected from the group consisting of hydrogen-containing cations, metal cations, and mixtures thereof.

29. The improvement of claim 28, wherein said metal cations are magnesium cations.

30. In a catalytic process which comprises contacting hydrocarbons at catalytic cracking conditions with a fluidized physical mixture of catalytic components including (A) amorphous catalytic cracking catalysts consisting essentially of a major amount of silica and a minor amount of alumina and (B) crystalline alumino-silicate zeolite encapsulated in siliceous matrix; the improvement which comprises maintaining the concentration of said (A) component within the range of about 50 to about 90 weight percent and the concentration of said (B) component within the range of about 10 to about 50 weight percent of said fluidized physical mixture by feeding both components to the reactor in an amount sufficient to maintain said concentrations and the desired reactor loading during said process.

References Cited

UNITED STATES PATENTS

| | | | |
|---|---|---|---|
| 3,140,249 | 7/1964 | Plank et al. | 208—120 |
| 3,143,491 | 8/1964 | Bergstrom | 208—74 |
| 3,312,615 | 4/1967 | Cramer et al. | 208—120 |

DELBERT E. GANTZ, Primary Examiner

A. RIMENS, Assistant Examiner

U.S. Cl. X.R.

252—455